Jan. 2, 1923. 1,440,626
G. PROCK.
DIRECTION INDICATING DEVICE FOR AUTOMOBILES.
FILED DEC. 14, 1920.
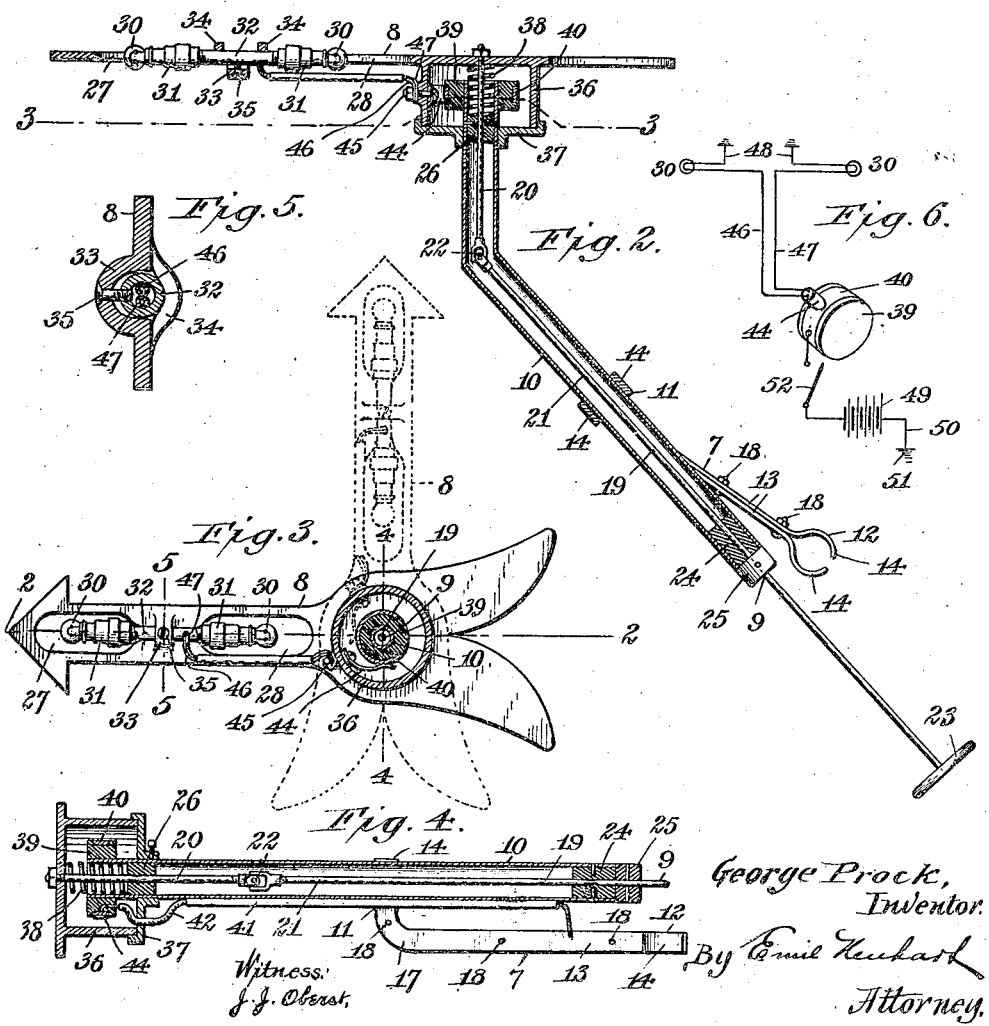

Patented Jan. 2, 1923.

1,440,626

UNITED STATES PATENT OFFICE.

GEORGE PROCK, OF BUFFALO, NEW YORK.

DIRECTION-INDICATING DEVICE FOR AUTOMOBILES.

Application filed December 14, 1920. Serial No. 430,700.

*To all whom it may concern:*

Be it known that I, GEORGE PROCK, a citizen of the United States, residing at Buffalo, in the county of Erie and State of New York, have invented certain new and useful Improvements in Direction-Indicating Devices for Automobiles, of which the following is a specification.

My invention relates to a direction indicating device adapted to be attached to an automobile, and by the use of which occupants of vehicles following, and occupants of vehicles and other persons ahead, may be informed of the direction it is intended to travel.

The object of my invention is to provide an improved signal or indicator which can be easily attached to the windshield of an automobile with the operating handle of the indicator within easy reach of the driver or other occupant of the automobile, so that he can signal or indicate the direction he intends to travel.

Another object of my invention is to provide a signaling device or indicator having an indicating arm capable of being moved into any of four positions to indicate a straight-ahead course, a stop, or a right, or left turn; and to provide such indicating arm with night signals capable of being distinguished from other lights on the automobile.

A further object is to provide a simple, inexpensive, and durable device of this kind having few parts and wherein the night signals are ignited in all positions of the indicating arm excepting that indicating the straight-ahead course.

With these and other objects in view, the invention consists in the novel features of construction and in the arrangement and combination of parts to be hereinafter described and more particularly pointed out in the subjoined claims.

In the drawings:—

Fig. 1 is a perspective view of a portion of an automobile having my improved direction indicating device attached to the left hand end of the windshield.

Fig. 2 is a central horizontal section through the device taken on line 2—2, Fig. 3.

Fig. 3 is a transverse section taken on line 3—3, Fig. 2.

Fig. 4 is a vertical longitudinal section taken on line 4—4, Fig. 3.

Fig. 5 is an enlarged cross section taken on line 5—5, Fig. 3.

Fig. 6 is a diagrammatic view showing the night signals of the indicating arm, the electrical contact-device, a battery, and the circuit wires connecting said parts.

My invention, broadly considered, comprises a support 7, a signaling or indicating member 8, a manipulating member 9, and a carrying member 10 secured to said support and adapted to carry the signal or indicating member and the manipulating member.

The support 7 is provided with an outer clamp-end 11, and with an inner clamp-end 12, it being preferably formed of two iron straps or bars 13 bent at opposite ends to form U-shaped portions 14 which cooperate to form the clamp-ends. The U-shaped portions at the inner end of the support are adapted to straddle the upright 15 of the windshield 16, as clearly shown in Fig. 1, while the outer U-shaped portions are adapted to straddle the carrying member 10, which is in the form of a tube of angular formation, as best shown in Figs. 1 and 2.

The support is bent, as at 17, so that the outer clamp-end is disposed at substantially a right-angle to the inner clamp-end, due to the fact that said outer clamp-end straddles and holds a part of the device disposed horizontally, while the inner clamp-end is secured to a vertical part of the windshield, as described.

The two straps or bands 13 of the support are secured together by means of bolts 18, as best shown in Fig. 2, and when applied to the carrying member or tube 10 and to the windshield, the tightening of these bolts will securely fasten said support to the windshield, and the carrying member or tube 10 to said support.

Passing through the tube 10 forming the carrying member is the manipulating member 9 which is in the form of a rotatable rod 19 and comprises two sections 20, 21 connected together by a universal joint 22. Said joint is arranged at the angle of the tube 10 and therefore the section 20 of the manipulating rod is disposed at an angle to the section 21, the section 20 trending in the direction of the length of the car while the section 21 trends inwardly and rearwardly from the universal joint 22 so that the inner end thereof will be within convenient reach of the driver. For convenience, I provide the inner end of the manipulating rod 19 with a disk or hand wheel 23. This rod is rotatable in a fiber or other bushing 24 forcibly entered, or fastened, into the tube 10 with the outer end of the bushing flush with the inner or rear end of said tube. In order to prevent lengthwise movement of said manipulating rod in a forward direction, a collar 25 is secured thereto, which bears against the outer end of the bushing 24 and against the inner or rear end of the tube 10.

Within the tube 10 near its front end, a bushing 26 is arranged. This bushing is pinned or otherwise secured within said tube and serves as a journal for the forward section 20 of the manipulating rod, and in addition thereto serves as an abutment, as will be hereinafter explained.

The front end of the manipulating rod 19 is threaded and to said threaded portion is secured the signaling or indicating member 8. This member is in the form of an arm of arrow formation, and has spaced openings 27, 28 therein. In each of these openings a small incandescent lamp 30 is secured and these lamps are entered in sockets 31 fastened to a tube 32 secured lengthwise within said arm between bulged-out portions 33, 34, formed, respectively, on opposite sides of said arm, said tube being secured in place by means of a screw 35 passed through the bulged-out portion 33 and entered into the tube 32.

On the rear face of the indicating arm a circular flange 36 is formed. Said flange forms a housing which is closed at its rear by a disk or cover 37 slidably arranged on the tube 10 but adapted to be maintained in contact with the rear edge of the flange 36.

Interposed between the rear face of the indicating arm and the bushing or abutment 26 within the tube 10 and surrounding the manipulating rod 19 is a spiral expansion spring 38, said spring expanding to prevent wabbling of the indicating arm and to maintain said arm in any position it may be rotated to.

Secured to the front end of the tube 10 is a fiber or other insulation disk 39, which has a parti-cylindrical contact band or member 40 around its periphery, said band being embedded in said disk and having its ends separated with the peripheral portion of the disk between said ends even with the outer surface of said band. Secured to the tube 10, preferably on the under side thereof, is a comparatively small tube 41 through which is passed an electric conducting wire 42 having one end thereof grounded on the automobile, as indicated at 43, Fig. 1, in which case the battery of the automobile will have one of its poles grounded, as will be apparent to those skilled in the art or if desired, said wire may be led directly to the battery or other source of electric energy, as indicated in Fig. 6. The other end of said wire is connected to the metallic contact band 40, as clearly shown in Figs. 4 and 6.

Secured to the flange 36 or, as it may be termed, to the contact bushing, is a flexible contact member 44. This contact member is secured to the inner surface of said flange or housing by a screw 45, which extends outwardly through said flange or housing and is insulated therefrom in any approved manner. This flexible contact member has two wires 46, 47 secured thereto, which are led to and connected with the incandescent lamps 30, said wires being passed through the tube 32 fastened to said indicating arm and carrying said incandescent lamps. From said lamps the current passes through the indicating arm, and through the tube 10 and support 7 to metallic parts of the automobile, these parts being indicated as a current conductor by the lines 48 in Fig. 6, and in this figure a battery, designated by the numeral 49, has a conducting wire 50 connected thereto, which is also grounded, as at 51. From one pole of the battery the current therefore passes to the contact member 40, from the latter to the flexible contact member 44 and through the wires 46, 47, to the lamps 30, and from said lamps the current is grounded, as above described, while the other pole of the battery is also grounded to complete the circuit.

If it should be desired to have the incandescent lamps lighted at night only, a switch 52 will of course be placed within the circuit to permit the lamps to be cut out during the day, as shown, for example, in Fig. 6.

The indicating arm 8 with its flange or housing 36 and the cover 37 for said housing are preferably constructed of aluminum so that the device will be light and easily carried by the support 7.

With the indicating arm in the position shown in Figs. 1, 2 and 3, information is given that it is the intention of the driver to turn the automobile to the left. When this indicating arm is in an opposite position, information will be given that the automobile is to be turned to the right. When the arm is swung into an upright position, as shown in dotted lines in Fig. 3, information is given that the automobile is to be stopped, and when the indicating arm is swung into a vertical position downwardly, a straight course ahead is indicated.

As clearly shown in Fig. 3, the flexible contact 44 will be in engagement with the parti-cylindrical contact member 40 on the insulation disk 39 when the arm is swung to indicate a right turn, a left turn, or a stop; but when the arm is swung to point downwardly, said flexible contact member will engage the insulation disk at a point between the ends of said parti-cylindrical contact member 40. With the circuit wires arranged for lighting both incandescent lamps 30, which are preferably colored red, both lamps will be lighted at all times except when the indicating arm 8 indicates a straight-ahead course.

By providing the indicating arm 8 with two red lights and positioning the same to one side on the windshield, these lights can be seen from the front and the rear, since they are in the openings 26 within the arm and visible from both directions; and moreover, the arrangement of two lights in proximity to each other makes it possible, from a distance to distinguish the same from the other lights on the automobile and the plane in which they may happen to be positioned can also be readily determined.

Having thus described my invention, what I claim is:—

1. A device of the kind described, comprising a support adapted to be secured to an automobile, an angular tube secured to said support and having its front portion parallel with the length of the automobile and its rear portion at an angle thereto, a rotatable manipulating rod extending through said tube and having a universal joint at the angle of said tube, an indicating arm secured to the front end of said rod, and a spring for retaining said indicating arm in any position to which it may be rotated.

2. A device of the kind described, comprising a tube adapted to be maintained in a fixed position and having its front portion at an angle to its rear portion with the rear portion trending inwardly and rearwardly and the front portion arranged parallel with the length of the automobile, a manipulating rod rotatable in said tube and extending from opposite ends thereof, said rod having a universal joint at the angle of said tube, and an indicating arm secured to the forwardly-projecting end of said manipulating rod and rotatable therewith.

3. A device of the kind described, comprising a support having two connected bars, each bar having a U-shaped portion at each end and both having the U-shaped portions at corresponding ends co-acting to form a clamp-end, one clamp-end being adapted to straddle a portion of a windshield, a tube secured in the other clamp-end of said support, a manipulating rod extending through said tube and rotatable therein, and an indicating arm secured to one end of said manipulating rod.

4. A device of the kind described, comprising a support having two bars secured together between their ends and having corresponding ends of each bar bent at an angle to form an upward extension, said bars having co-acting extremities serving as clamp-ends, one of said clamp-ends being adapted to straddle a portion of a windshield, a tube clamped within the other clamp-end, a manipulating rod extending through said tube and rotatable therein, and an indicating arm secured to one end of said manipulating rod.

5. A device of the kind described, comprising a supported tube having an abutment therein near one end, a manipulating rod extending through said tube and rotatable therein, an indicating arm secured to one end of said manipulating rod, and a spiral spring surrounding said manipulating rod and bearing with one end against said indicating arm and with its other end against said abutment.

6. A device of the kind described, comprising a supported tube open at opposite ends, a manipulating rod extending through said tube, an indicating arm secured to one end of said manipulating rod and having a circular flange on its rear face, a disk slidable on said tube but retained in contact with the edge of said circular flange, said disk and circular flange forming a housing, and means within said housing to retain said indicating arm in desired adjusted position.

7. A device of the kind described, comprising a supported tube having an abutment therein near one end, a manipulating rod extending through said tube and rotatable therein, an indicating arm secured to one end of said manipulating rod and having a circular flange extending from its rear face, a disk supported by said tube and fitting against said circular flange, said circular flange and disk serving as a housing, and a spring surrounding said manipulating rod within said housing and bearing with one end against the rear face of said indicating arm and with its other end against the abutment within said tube.

In testimony whereof I affix my signature.

GEORGE PROCK.